United States Patent [19]

Ise

[11] Patent Number: 4,600,230
[45] Date of Patent: Jul. 15, 1986

[54] FLUID FEEDING VALVE AND A VACUUM CHUCK APPARATUS USING SAME

[75] Inventor: Yoji Ise, Tokyo, Japan
[73] Assignee: Myotoku Ltd., Tokyo, Japan
[21] Appl. No.: 700,509
[22] Filed: Feb. 11, 1985
[51] Int. Cl.⁴ .......................... B66C 1/02; G05D 7/00
[52] U.S. Cl. .................................... 294/64.2; 137/102
[58] Field of Search .................. 137/102; 251/22; 294/64.2; 417/187–189

[56] References Cited

U.S. PATENT DOCUMENTS

| | | | |
|---|---|---|---|
| 2,764,174 | 9/1956 | Wilson | 137/102 |
| 3,219,380 | 11/1965 | Carliss | 294/64.2 |
| 3,680,582 | 8/1972 | Pauliukonis | 137/102 |

FOREIGN PATENT DOCUMENTS 2038282 7/1980 United Kingdom ............... 294/64.2

Primary Examiner—James C. Yeung
Attorney, Agent, or Firm—Robert E. Burns; Emmanuel J. Lobato; Bruce L. Adams

[57] ABSTRACT

A fluid feeding valve, having a valve chamber with a valve member contained movably therein, the valve member being actuated by the pressure difference between fluid receiving port and fluid feeding port to close and open said ports alternately. The fluid feeding valve body also comprises a fluid reservoir communicating with said fluid receiving and feeding ports.

When the fluid receiving port receives the pressurized fluid, the valve member closes the fluid feeding port and the pressurized fluid is stored in the fluid reservoir through the valve chamber, and when the fluid receiving port stops the receiving of fluid, the valve member closes the fluid receiving port and opens the fluid feeding port, and the pressurized fluid stored in the reservoir is fed to the fluid feeding line automatically.

A vacuum chuck apparatus actuated by the air ejector pump and using such fluid feeding valve is also provided, in which when the air ejector pump stops, the pressurized air stored in the fluid reservoir is fed into the suction pad through the fluid feeding valve and the negative pressure remaining therein can be removed rapidly. Thus a quick acting chuck device can be obtained by the use of such fluid feeding valve of very simple construction.

12 Claims, 1 Drawing Figure

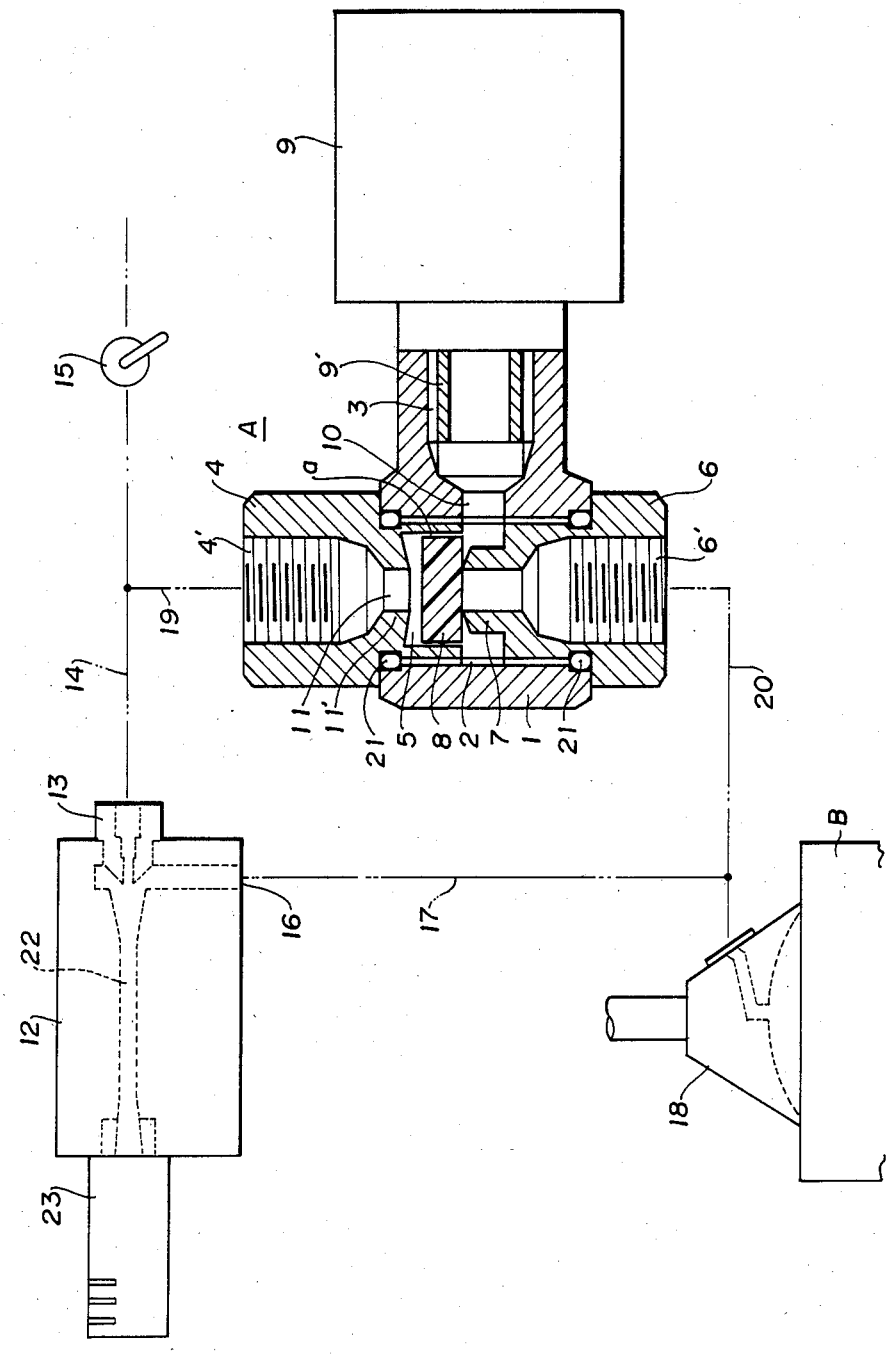

FLUID FEEDING VALVE AND A VACUUM CHUCK APPARATUS USING SAME

BACKGROUND OF THE INVENTION

The present invention relates to a fluid feeding valve, and a vacuum chuck apparatus using the same for rapidly releasing the vacuum in the suction pad of a chuck device.

The rapid releasing means of the suction pad from the article or work is required for a quick-acting vacuum chuck device, and conventionally, the device using such as timer and magnetic valve is used for the purpose. But such a construction is very complicated and expensive.

Therefore, an object of the present invention is to provide a fluid feeding valve of very simple construction, which can be used for the vacuum chuck apparatus using an air ejector pump.

SUMMARY OF THE INVENTION

The fluid feeding valve of the present invention comprises a valve body having a fluid receiving port and a fluid feeding port provided at opposite ends of an axial bore in said valve body, and a valve chamber disposed between said fluid receiving and feeding ports, each of said ports being open to said valve chamber through a valve seat, and means for connecting each of said ports to a pressurized fluid line and a fluid feeding line respectively, said valve body having another port communicating with said fluid feeding port through said valve seat thereof, said another port also communicating with said valve chamber through a bypath of small sectional area, and means for connecting said another port to a fluid reservoir having suitable volume. A valve member is fitted movably within said valve chamber and is moveable to one position to open said fluid receiving port to said fluid reservoir and close said fluid feeding port and charge a pressurized fluid into said fluid reservoir, when a pressurized fluid is fed into said pressurized fluid line, and is movable to another position to close said fluid receiving port and open said fluid feeding port to said fluid reservoir and feed the pressurized fluid stored in said fluid reservoir to said fluid feeding line, when the feeding of the pressurized fluid into said pressurized fluid line is stopped.

The vacuum chuck apparatus of the present invention comprises an air ejector pump having a nozzle and a venturi hole in a pump body, said venturi hole being disposed opposedly to said nozzle thereby forming a suction chamber therebetween, said nozzle being connected to a pressurized air line, and said suction chamber being connected to a suction pad means of a chuck device by a vacuum line. An air feeding valve comprises a valve body having an axial bore with ports at opposite ends and a valve chamber disposed therebetween, each of said ports being open to said valve chamber through a valve seat, and means for connecting each of said ports to said pressurized air line and a vacuum line respectively, said valve body having another port communicating with said port connected to said vacuum line through said valve seat thereof, said another port also communicates with said valve chamber through a bypath of small sectional area, and means for connecting said port to an air reservoir having a suitable volume. A valve member is fitted movably within the valve chamber and is adapted to open said port connected to said pressurized air line to said reservoir, and close said port connected to said vacuum line and charge the pressurized air into said air reservoir, while the pressurized air is fed into said pressurized air line to operate said air ejector pump and the negative pressure takes place within said suction pad means, and close said port connected to said pressurized air line and open said port connected to said vacuum line so that the pressurized air in said air reservoir being is into said suction pad means through said vacuum line and releases the vacuum in said suction pad means, when the feeding of pressurized air through said pressurized air line is stopped.

In a preferred embodiment, above-mentioned bypath is a gap formed between said valve member and the inner wall of the valve chamber.

In another embodiment, said reservoir is connected replaceably to the valve body, so that the reservoir of suitable volume can be used by replacing the same.

BRIEF DESCRIPTION OF THE DRAWING

The Drawing shows a sectional view of a fluid feeding valve illustrating one embodiment of the present invention, the drawing also shows a schematic view, illustrating one example of the vacuum chuck apparatus using said fluid feeding valve.

DESCRIPTION OF THE PREFERRED EMBODIMENT

In the drawing, a fluid feeding valve (A) of the present invention comprises a valve body (1) having an axial bore (2) and a bore (3) communicating crosswise with said axial bore (2).

At each end of the axial bore (2), connectors (4) and (6) are mounted respectively by the screw engagement. Upper connector (4) has a fluid receiving port (4') on the outer surface and a recess (5) with a valve seat (11') on the inner surface and is used for connecting said axial bore (2) to the pressurized fluid line. Lower connector (6) has a fluid feeding port (6') on the outer surface and an annular valve seat (7) on the inner surface and is used for connecting said axial bore (2) to the vacuum line. The recess (5) forms a valve chamber and each port (4') and (6') opens to this valve chamber (5) through a hole in each valve seat (11') and (7).

A disk shape valve member (8) formed of a resilient material such as rubber or synthetic resin is fitted movably within the valve chamber (5) thereby forming a gap (a) between the inner wall of the valve chamber (5). Another port is provided at the end of the cross bore (3), and a fluid reservoir (9) of suitable volume is mounted on said port replaceably by a screw engagement (9'). The fluid reservoir (9) communicates with the fluid receiving port (4') through a hole (10) of this another port, gap (a), valve chamber (5) and the hole (11) of the upper valve seat (11'). The reservoir (9) also communicates with the fluid feeding port (6') through the hole (10) and hole of the lower valve seat (7).

(12) is an air ejector pump, having a nozzle (13) and a venturi hole (22) in the pump body. The venturi hole (22) is disposed opposedly to the nozzle (13) thereby forming a suction chamber therebetween.

The nozzle (13) is connected to a pressurized air source such as an air compressor through a pressurized air line (14) and a stop valve (15), and the suction chamber is connected to vacuum-actuated holding means comprised of the suction pad (18) of a chuck device through a suction port (16) and a vacuum line (17), while the fluid receiving port (4') of the fluid feeding valve (A) is connect to the pressurized air line (14) through a connecting pipe line (19) and the fluid feeding port (6') of the valve (A) is connected to the vacuum line (17) through a pipe line (20). In this manner, the air ejector pump (12) and the fluid feeding valve (A) are connected in parallel to the pressurized air line (14) and the vacuum line (17). (21) are sealing members provided between the valve body (1) and connectors (4) and (6).

The apparatus functions as follows.

When the pressurized air is fed into the nozzle (13) by opening the stop valve (15), the air is ejected into venturi hole (22), thereby the air in the suction pad (18) is sucked into the venturi hole (22) through the vacuum line (17), suction port (16) and the suction chamber, and discharged to the atmosphere through a silencer (23), thus the suction pad (18) may stick to the article (B) and can transfer the same.

Concurrently, the pressurized air is also fed to the fluid receiving port (4') of the fluid feeding valve (A) and flows into the valve chamber (5), while a negative pressure or vacuum forms in the hole of the lower valve seat (7), as the fluid feeding port (6') is connected to the vacuum line (17), and thus the valve member (8) is actuated by this pressure difference between the upper and lower sides of the valve member and engages with the lower valve seat (7) to thereby close the fluid feeding port (6').

The pressurized air fed into the valve chamber (5) is charged into the fluid reservoir (9) through the gap (a) and the hole (10). The diameter of the valve member (8) is formed larger than that of the valve seat (7), so that the under side thereof is also exposed to the pressurized air in the valve chamber (5).

After the transfer of the article (B) is finished, the stop valve (15) is closed. Then the air ejector pump (12) stops and the atmospheric air flows reversely into the suction pad (18) through the silencer (23), venturi hole (22), suction port (16) and the vacuum line (17) and begins to reduce the negative pressure in the suction pad (18), but concurrently air pressure at the fluid receiving port (4') also drops or decreases rapidly, so that the pressurized air stored in the fluid reservoir (9) moves the valve member (8) upward and the valve member (8) closes the fluid receiving port (4') and opens the fluid feeding port (6'). As a result, the pressurized air stored in the reservoir (9) is rapidly fed into the suction pad (18) within a short time interval by passing through the fluid feeding port (6'), and the connecting pipe line (20). Therefore, the negative pressure or vacuum remaining within the suction pad (18) is removed rapidly, so that the device can release the article rapidly even if the vacuum line 17 is long and exhibits high flow resistance. Thus a quick acting chuck device may be obtained.

As described above, the fluid feeding valve of the present invention can store the pressurized air in the fluid reservoir while the air ejector pump is operating, and can feed the stored pressurized air automatically when the air ejector pump stops, by such fluid feeding valve of very simple construction.

A hole of small sectional area provided in the valve body (1) may be used as a bypath connecting the fluid reservoir (9) to the valve chamber (5) in lieu of providing the gap (a). The reservoir (9) of suitable volume may be used by replacing according to the size and number of the suction pad (18), and the length of the lines (17) and (20), etc.

What is claimed is:

1. A vacuum chuck apparatus comprising:
   an air ejector pump having a nozzle and a venturi hole in a pump body, said venturi hole being disposed opposedly to said nozzle to define a suction chamber therebetween, said nozzle being connected to a pressurized air line, and said suction chamber being connected to a suction pad means of a chuck device by a vacuum line; and
   an air feeding valve comprising a valve body having an axial bore with ports at opposite ends and a valve chamber disposed therebetween, each of said ports being open to said valve chamber through a valve seat, means for connecting said ports to said pressurized air line and said vacuum line respectively, said valve body having another port communicating with said port connected to said vacuum line through said valve seat thereof, said another port also communicating with said valve chamber through a bypath of small sectional area, means for connecting said another port to an air reservoir having suitable volume, and a valve member disposed movably within said valve chamber and movable to one position to open said port connected to said pressurized air line to said reservoir and to close said port connected to said vacuum line so as to charge the pressurized air into said air reservoir while the pressurized air is fed into said pressurized air line to operate said air ejector pump and the negative pressure takes place within said suction pad means, and movable to another position to close said port connected to said pressurized air line and open said port connected to said vacuum line to enable the pressurized air in said air reservoir to be fed into said suction pad means through said vacuum line so as to release the vacuum in said suction pad means, when the feeding of pressurized air through said pressurized air line is stopped.

2. The vacuum chuck apparatus of claim 1, wherein said bypath in said air feeding valve comprises a gap formed between said valve member and the inner wall of said valve chamber.

3. The vacuum chuck apparatus of claim 1, wherein said air reservoir in said air feeding valve is replaceably connected to said another port of valve body.

4. A vacuum chuck apparatus comprising: holding means operative when actuated by vacuum to releasably hold by vacuum an article; an air ejector pump connected through a vacuum line to the holding means and operative when supplied with pressurized air from a pressurized air line to supply vacuum through the vacuum line to actuate the holding means; means defining a fluid reservoir for storing pressurized air during use of the vacuum chuck apparatus; and valve means operable in one mode in response to the pressure of the pressurized air in the pressurized air line for providing fluid communication between the pressurized air line and the fluid reservoir while blocking fluid communication between the fluid reservoir and the holding means to thereby enable pressurized air to be charged into the fluid reservoir during actuation of the holding means, and operable in another mode in response to a sudden drop in the pressure of the pressurized air in the pressurized air line for providing fluid communication between the fluid reservoir and the holding means while blocking fluid communication between the fluid reservoir and the pressurized air line to thereby enable the pressurized air stored in the fluid reservoir to be supplied to the holding means to rapidly reduce the vacuum therein to effect quick release of the article.

5. A vacuum chuck apparatus according to claim 4; wherein the valve means comprises a valve body having an inlet port communicating through a valve chamber with an outlet port and having another port communicating through the valve chamber with the fluid reservoir, and a movable valve element disposed in the valve chamber for alternate movement between a first position corresponding to the one mode in which the valve element closes the outlet port and communicates the inlet and another ports and to a second position corresponding to the another mode in which the valve element closes the inlet port and communicates the outlet and another ports; and means connecting the inlet port to the pressurized air line for flowing pressurized air to the inlet port and means connecting the outlet port to the holding means for flowing the stored pressurized air from the fluid reservoir to the holding means.

6. A vacuum chuck apparatus according to claim 5; wherein the valve means includes means defining a bypath for communicating the inlet and another ports when the valve element is in the first position.

7. A vacuum chuck apparatus according to claim 6; wherein the means defining a bypath comprises means defining a gap between the valve element and the inner wall of the valve chamber.

8. A vacuum chuck apparatus according to claim 5; wherein the valve means includes an annular valve seat projecting into the valve chamber and having a hole therethrough communicating the valve chamber and the outlet port, the valve seat being positioned relative to the another port so as to provide communication between the inlet and another ports when the valve element is in the first position in which the valve element is seated on the valve seat.

9. A vacuum chuck apparatus according to claim 5; wherein the holding means comprises a suction pad.

10. A vacuum chuck apparatus according to claim 5; wherein the air ejector pump and the valve means are connected in parallel to the pressurized air line and the vacuum line.

11. A vacuum chuck apparatus according to claim 4; wherein the air ejector pump and the valve means are connected in parallel to the pressurized air line and the vacuum line.

12. A vacuum chuck apparatus according to claim 4; wherein the holding means comprises a suction pad.

* * * * *